(12) United States Patent
Frances et al.

(10) Patent No.: US 9,371,428 B2
(45) Date of Patent: Jun. 21, 2016

(54) SILICONE-SELF-ADHESIVES, METHOD OF PRODUCTION, COMPLEXES USING THEM AND THEIR USES

(75) Inventors: Jean-Marc Frances, Meyzieu (FR); Sean Duffy, Meyzieu (FR)

(73) Assignee: BLUESTAR SILICONES FRANCE SAS, Lyons (FR)

(*) Notice: Subject to any disclaimer, the term of this patent is extended or adjusted under 35 U.S.C. 154(b) by 617 days.

(21) Appl. No.: 12/810,744

(22) PCT Filed: Dec. 23, 2008

(86) PCT No.: PCT/EP2008/068261
§ 371 (c)(1),
(2), (4) Date: Mar. 9, 2011

(87) PCT Pub. No.: WO2009/083563
PCT Pub. Date: Jul. 9, 2009

(65) Prior Publication Data
US 2011/0189422 A1    Aug. 4, 2011

(30) Foreign Application Priority Data

Dec. 27, 2007  (FR) ...................................... 07 60382

(51) Int. Cl.
*H05H 1/00* (2006.01)
*C08J 7/12* (2006.01)
*B29C 59/14* (2006.01)
*B29K 83/00* (2006.01)

(52) U.S. Cl.
CPC ............... *C08J 7/123* (2013.01); *B29C 59/14* (2013.01); *C08J 7/12* (2013.01); *B29C 59/142* (2013.01); *B29C 2059/145* (2013.01); *B29K 2083/00* (2013.01); *C08J 2383/00* (2013.01); *C08J 2383/04* (2013.01); *C09J 2421/00* (2013.01); *C09J 2433/00* (2013.01); *C09J 2483/005* (2013.01); *Y10T 428/1462* (2015.01); *Y10T 428/1476* (2015.01)

(58) Field of Classification Search
CPC ............................. B29C 59/14; B29C 59/147
USPC ............. 427/532, 533, 535, 536, 207.1, 208, 427/2.1, 2.11, 2.28; 204/164, 165, 168
See application file for complete search history.

(56) References Cited

U.S. PATENT DOCUMENTS

| | | | | |
|---|---|---|---|---|
| 4,261,806 A * | 4/1981 | Asai et al. | ...................... | 204/165 |
| 4,312,693 A * | 1/1982 | Salensky | ............. | B32B 38/0008 |
| | | | | 156/272.2 |
| 4,767,414 A * | 8/1988 | Williams et al. | ............... | 604/230 |
| 4,842,889 A * | 6/1989 | Hu et al. | ......................... | 427/536 |
| 5,338,312 A * | 8/1994 | Montgomery | ................ | 604/230 |
| 5,576,068 A | 11/1996 | Caburet et al. | | |
| 5,866,261 A * | 2/1999 | Kerr et al. | ...................... | 428/447 |
| 5,972,176 A * | 10/1999 | Kirk et al. | ...................... | 204/164 |
| 6,824,848 B2 * | 11/2004 | Dhaler et al. | ................. | 428/40.1 |
| 7,147,758 B2 * | 12/2006 | Cocolios et al. | ............... | 204/164 |
| 7,205,372 B2 * | 4/2007 | Delarche et al. | ................. | 528/15 |
| 7,455,892 B2 | 11/2008 | Goodwin et al. | | |
| 2003/0075432 A1 | 4/2003 | Cocolios et al. | | |
| 2003/0186013 A1 | 10/2003 | Dhaler et al. | | |
| 2004/0231926 A1* | 11/2004 | Sakhrani et al. | ................. | 184/18 |
| 2005/0031795 A1* | 2/2005 | Chaudhury et al. | .......... | 427/535 |
| 2006/0157453 A1* | 7/2006 | Dumont et al. | ............. | 219/121.5 |

FOREIGN PATENT DOCUMENTS

| | | | |
|---|---|---|---|
| FR | 2873705 | A | 2/2006 |
| JP | 1970-006433 | B | 3/1970 |
| JP | 1984-071336 | A | 4/1984 |
| JP | 2005-531654 | A | 10/2005 |
| JP | 2007-246807 | | 3/2006 |
| JP | 2007-246807 | A | 3/2006 |
| WO | 03/106145 | A1 | 12/2003 |

* cited by examiner

*Primary Examiner* — Michael Wieczorek
(74) *Attorney, Agent, or Firm* — McAndrews, Held & Malloy, Ltd.

(57) ABSTRACT

Method for preparing a substrate comprising an anti-adhesive silicone coating obtained from an anti-adhesive silicone composition based on crosslinked silicone oil(s) with adhesion properties that are modified compared with the initial properties thereof, in which provision is made for a substrate at least partly coated with an anti-adhesive silicone coating and the anti-adhesive silicone coating is cold-plasma-treated, approximately at atmospheric pressure, in an optionally doped nitrogen atmosphere or in an optionally doped carbon dioxide atmosphere, substrate at least partially coated with an anti-adhesive silicone composition, silicone-self-adhesive complex and uses.

14 Claims, No Drawings

SILICONE-SELF-ADHESIVES, METHOD OF PRODUCTION, COMPLEXES USING THEM AND THEIR USES

The present invention relates to silicone-self-adhesives, their method of production, complexes using them and their uses.

In various fields, an anti-adhesive silicone coating is applied to a substrate, and an adhesive coating to another substrate, then the surfaces thus coated are placed face to face and finally pressed against each other in order to make the substrates adhere reversibly. The systems concerned are for example those of pressure-sensitive labels or adhesive tapes. Depending on the use or the marketing positioning of the product, a greater or lesser release force may be desired in order to make opening difficult or, on the contrary, easier.

In order to modulate this release force, use of the Corona treatment has already been proposed. But the effect obtained is not homogeneous and is only temporary.

The release force has also been modulated by treatment with UV or electron beam radiation (EP-A-1 278 809). But such a treatment is applicable only to substrates which are transparent to UV radiation. Moreover, the energy transmitted is not easy to control.

The incorporation of MQ or $MM^{Vi}Q$ or $MD^{Vi}Q$ or MM'Q or MD'Q silicone resins in the composition of the silicone coating, is another known means of modulation of this release force in the abovementioned systems. But these types of resin are difficult to produce. Conventionally, M means "siloxy unit monosubstituted by an oxygen atom $R_3SiO_{1/2}$", D means "siloxy unit di-substituted by an oxygen atom $R_2SiO_{2/2}$", Q means "siloxy unit tetra-substituted by an oxygen atom $SiO_{4/2}$", M' means "siloxy unit monosubstituted by an oxygen atom and comprising an H group bound to the silicon atom $HR_2SiO_{1/2}$", D' means "siloxy unit di-substituted by an oxygen atom and comprising an H group bound to the silicon atom $HRSiO_{2/2}$", $M^{Vi}$ means "siloxy unit monosubstituted by an oxygen atom and comprising a Vinyl group $H_2C=CH-$ bound to the silicon atom $ViR_2SiO_{1/2}$", $D^{Vi}$ means "siloxy unit di-substituted by an oxygen atom and comprising a Vinyl group bound to the silicon atom $ViRSiO_{2/2}$".

It has also been proposed to obtain silicone coatings from plasma under vacuum as described in the PCT application WO02/28548, but this method is difficult to apply in order to directly obtain anti-adhesive coatings with a large surface area at high speed.

Moreover, through Patent application FR-A-2 873 705, a method of treatment with cold plasma under atmospheric pressure is known, for treating a polyester or polyamide (PA) surface with a view to promoting its subsequent assembly with a polyolefins. In this method, the surface of the substrate to be treated is subjected to a cold plasma created by action of an electric discharge on a nitrogen-based plasma-forming gas, having an oxygen content of less than 50 ppm, at a pressure of the order of atmospheric pressure, so as to graft in particular amine-type nitrogenous functions onto the surface of the substrate, the nitrogen atoms grafted onto the surface of the substrate representing from 0.5 to 10%, preferably from 1.5 to 4%, of the surface atomic compositions in terms of carbon, oxygen and nitrogen obtained by ESCA measurement at an angle of 75°.

Patent application WO-A-01/58992 relates to a method of plasma surface treatment of polymeric substrates (polyolefin, vinyl polymer, polystyrene, polyester, polyamide, polyacrylonitrile or polycarbonate) during which the substrate is subjected to a dielectric barrier electrical discharge, in a gaseous mixture comprising a carrier gas ($N_2$), and a reducing ($H_2$ at 50-30 000 ppm vol) and/or oxidizing gas ($CO_2$ at 50-2 000 ppm vol), at atmospheric pressure. This treatment increases surface energy and adhesion.

All this prior art offers no satisfactory solution to the problem of the modulation of the adhesion of anti-adhesive silicone coatings.

Given their high price, it would be desirable not to use MQ, or $MM^{Vi}Q$, or $MD^{Vi}Q$, or MM'Q, or MD'Q silicone resins in order to modulate the release force in an anti-adhesive silicone composition.

It would also be desirable to be able to modulate the release force linearly between 10 cN/cm and 300 cN/cm.

It would also be desirable to have available a method which is simple to implement with respect to plasma treatments under vacuum, which could be used in dynamic mode, i.e. it would be possible treat a moving substrate, even one moving at high speed.

Ideally, such a treatment should have virtually permanent effects, with good homogeneity.

Now, following prolonged research the applicant has developed a method leading to novel silicone compositions based on silicone oil which prove to be satisfactory.

This is why a subject of the present invention is a method for the preparation of a substrate comprising an anti-adhesive coating obtained from an "anti-adhesive" silicone composition based on silicone oil(s) at least partly cross-linked, this coating having modified adhesion properties with respect to its original properties. According to this method, a substrate is provided, at least partially coated with the abovementioned coating, and the anti-adhesive silicone substrate is treated with cold plasma, approximately at atmospheric pressure, in a nitrogen atmosphere optionally doped with less than 1% by weight of one or more of the elements in the group constituted by $H_2$; $N_2O$; Acetylene; $SiH_4$; $CF_4$, $CO_2$, $O_2$, $H_2O$, or in a carbon dioxide atmosphere, optionally doped with less than 1% by weight of one or more of the elements chosen from the group constituted by $H_2$; $N_2O$; Acetylene; $SiH_4$; $CF_4$, $N_2$, $O_2$, $H_2O$.

In the present application and in what follows, the expression ""anti-adhesive" silicone composition" designates a composition based on one or more polyorganosiloxane oils comprising M and D siloxy units, which can be cross-linked by polyaddition and/or by cationic and/or radicular route, preferably under actinic (e.g. UV) and/or thermal activation and/or under beam activation. Depending on the case, a catalyst based on platinum, a photoinitiator or an initiator is used for this cross-linking.

M represents $R_3SiO_{1/2}$— and D represents $R_2SiO$—. The R— radicals represent independently of each other —H, —OH or an organic radical chosen from linear or branched hydrocarbon radicals containing 0 or 1 degree of unsaturation, substituted or not, said organic radical being preferably:

- an alkyl group (having 1 to 8 carbon atoms) such as a methyl, ethyl, propyl, butyl, pentyl, hexyl, heptyl, octyl group and their isomers,
- an alkenyl group (having 1 to 8 carbon atoms) such as a vinyl, allyl and hexenyl group,
- an aryl group such as phenyl,
- a functional group such as an aminoalkyl, epoxyalkyl, (meth)acryloxyalkyl, isocyanoalkyl, trifluoroalkyl (in particular trifluoropropyl), or perfluoroalkyl (in particular perfluorobutylethyl) group.

Among these products, those where R designates a lower $C_1$-$C_4$ alkyl radical, more particularly methyl or a phenyl or trifluoropropyl radical are preferred.

The M units are, for example, $Me_3SiO_{1/2}$, $Me_2ViSiO_{1/2}$, $Me_2EpoxySiO_{1/2}$, $Me_2AcrylateSiO_{1/2}$, $ViMe_2SiO$ or $Me_2HSiO_{1/2}$ units; Me designating Methyl in all the formulae of the present invention.

The D units are for example $Me_2SiO_{2/2}$, $MeViSiO_{2/2}$, $MeHSiO_{2/2}$, $MeEpoxySiO_{2/2}$ or $MeAcrylateSiO_{2/2}$ units.

They are for example a composition based on $Me_2SiO_{2/2}$, $MeViSiO_{2/2}$, $Me_3SiO_{1/2}$, $Me_2ViSiO_{1/2}$, $Me_2HSiO_{1/2}$, $MeHSiO_{2/2}$ and $SiO_{4/2}$, preferably based on $Me_2SiO_{2/2}$, $MeViSiO_{2/2}$, $Me_3SiO_{1/2}$, $Me_2ViSiO_{1/2}$, $Me_2HSiO_{1/2}$, $MeHSiO_{2/2}$, and $SiO_{4/2}$<10% molar Si, in particular based on $Me_2SiO_{2/2}$, $Me_2ViSiO_{1/2}$, $MeViSiO_{2/2}$, $MeHSiO_{2/2}$, $Me_2HSiO_{1/2}$, $Me_3SiO_{1/2}$, and $SiO_{4/2}$<5% molar Si, and particularly based on $Me_2SiO_{2/2}$, $Me_2ViSiO_{1/2}$, $MeHSiO_{2/2}$, $Me_2HSiO_{1/2}$, $Me_3SiO_{1/2}$ and $SiO_{4/2}$=0% molar Si.

They are also for example a composition based on $Me_2SiO_{2/2}$, $Me_3SiO_{1/2}$, $Me_2EpoxySiO_{1/2}$, $MeEpoxySiO_{2/2}$ and $SiO_{4/2}$, preferably based on $Me_2SiO_{2/2}$, $Me_3SiO_{1/2}$, $Me_2EpoxySiO_{1/2}$, $MeEpoxySiO_{2/2}$ and $SiO_{4/2}$<10% molar Si, in particular based on $Me_2SiO_{2/2}$, $Me_3SiO_{1/2}$, $Me_2EpoxySiO_{1/2}$, $MeEpoxySiO_{2/2}$ and $SiO_{4/2}$<5 molar %, and particularly based on $Me_2SiO_{2/2}$, $Me_3SiO_{1/2}$, $Me_2EpoxySiO_{1/2}$, $MeEpoxySiO_{2/2}$ and $SiO_{4/2}$=0% molar Si.

They are also for example a composition based on $Me_3SiO_{1/2}$, $Me_2AcrylateSiO_{1/2}$, based on $Me_2SiO_{2/2}$, $MeAcrylateSiO_{2/2}$ and $SiO_{4/2}$, preferably based on $Me_3SiO_{1/2}$, $Me_2AcrylateSiO_{1/2}$, $Me_2SiO_{2/2}$, $MeAcrylateSiO_{2/2}$ and $SiO_{4/2}$<10% molar Si, in particular based on $Me_3SiO_{1/2}$, $Me_2AcrylateSiO_{1/2}$, $Me_2SiO_{2/2}$, $MeAcrylateSiO_{2/2}$ and $SiO_{4/2}$<5% molar Si and particularly based on $Me_3SiO_{1/2}$, $Me_2AcrylateSiO_{1/2}$, $Me_2SiO_{2/2}$, $MeAcrylateSiO_{2/2}$ and $SiO_{4/2}$=0% molar Si.

The coated substrate can be of various kinds such as paper or similar and/or plastic materials.

When the substrate is made of paper or similar, it can, for example, be a glassine, or a coated paper or also kraft paper.

When the substrate is constituted by one or more plastic materials, these are, for example, thermoplastics such as polyolefins such as polyethylene and polypropylene, polycarbonates, polyurethanes, the polyvinyl chlorides, polyesters (for example, polyethylene terephthalates), polymethacrylates, polyepoxides, polysulphones, polyamides, polyimides, polystyrenes, phenolic resins, epoxy or melamine-formaldehyde resins.

It can be also formed by metallic films, for example stainless or non-stainless steel, aluminium or copper preferably by thin metallic films.

The thickness of the substrate to be coated can range for example, depending on the application, from 0.001 to 10 mm, preferably from 0.01 to 1 mm, in particular from 0.05 to 0.5 mm, quite particularly from 0.02 to 0.2 mm.

The substrate can be presented in a flattened form such as a metallic sheet, a woven or a non-woven fabric, a film, a paper, a card, a tape, but also in a non-flattened, such as tubular form.

The substrate can moreover be presented in the form of natural or synthetic (woven or non-woven) fibres.

It can in particular be composite. It can be substantially or completely constituted by such compounds.

By "coated", is meant that all or part of the surface of the substrate can be coated with the anti-adhesive silicone composition, depending on the envisaged use. For example if the substrate is a sheet, one of the surfaces, or both surfaces, can be coated over a small, medium or large area.

It should be recalled that a cold plasma, also called a non-thermal plasma, is a plasma which appears under pressures which are not high pressures. Under these conditions, the only significant transmissions of energy between particles take place by electron collision. Thus no thermal equilibrium can be produced. The system is at ambient temperature at macroscopic level, hence the name cold plasma. However, at microscopic level the electrons emitted by the electrode collide with the gas molecules and activate them. This results in ionization or disassociation producing radicals. These excited species diffuse in the reactor chamber and reach the surface of the substrate. Several types of surface reactions can then occur: implantation, energy transfer, creation of bonds or destruction of bonds. The plasma medium, due to the presence of free radicals and ionized species, allows in particular a modification at the surface of the substrate treated under mild conditions.

The term "approximately at atmospheric pressure" designates for example a pressure of 0.5 to 2 bars, preferably 0.75 to 1.5 bar, in particular 0.75 to 1.25 bar, quite particularly 0.9 to 1.1 bar.

More particularly the ALDYNE® method is adopted, which consists of using filamentary electrical discharges, uniformly distributed at atmospheric pressure in gaseous mixtures of controlled composition and excluding any trace of oxygen from the air. Such a process makes it possible to carry out dry coating in autonomous fashion or in line by replacing for example Corona stations and/or primary coating stations. It is widely described in the literature, in particular by WO 01/58992 and by FR-A-2 873 705.

The atmosphere does not contain silicone, already present on the substrate. Thus, silicone is not deposited on the substrate by the plasma.

The atmosphere in which the cold plasma is utilized is neutral, preferably based on nitrogen.

It is possible to work without a dopant.

The dopant, which can be a reducing or oxidizing agent, advantageously represents from 0.0001% to 5%, preferably from 0.0001% to 1%, in particular from 0.0001% to 0.1%, quite particularly from 0.0001% to 0.05% by weight of the atmosphere used.

The dopant used is preferably $C_2H_2$ or $N_2O$.

A nitrogen-based atmosphere doped with $C_2H_2$ or $N_2O$, particularly $C_2H_2$ is preferred.

Under preferential conditions of implementation of the invention, the cold plasma treatment is implemented under the following conditions:

the electrical excitation discharge is a microwave discharge preferably from 1 to 5 GHz and preferably approximately 2.45 GHz, the dose received by the anti-adhesive silicone composition is 1 to 100 W/minute/$cm^2$, preferably 10 to 80 W/minute/$cm^2$, in particular 20 to 60 W/minute/$cm^2$, quite particularly 25 to 50 W/minute/$cm^2$, the reaction temperature can range from ambient temperature, i.e. approximately 20° C., to 80° C. preferably from 20° C. to 40° C.

Under other preferential conditions of implementation of the invention, the substrate is treated, not statically, but continuously or semicontinuously, moving through the plasma reactor. The movement can then be carried out at a linear speed comprised between 1 and 1000 m/min, in particular between 10 and 500 m/min and preferably between 20 and 250 m/min.

The substrates which are at least partially coated with an "anti-adhesive" silicone composition based on silicone oil(s) which are treated, preferably at least partly (e.g. completely cross-linked), then treated according to the above process are novel products.

This is why a subject of the present application is also a substrate at least partially coated with a coating comprising an anti-adhesive silicone composition based on silicone oil(s), preferably at least partly (ideally completely), cross-linked then treated according to the process described above.

Given the treatment to which they are subjected, the anti-adhesive silicone compositions at least partly (ideally completely) cross-linked have a modified structure. Thus, for example in the case where the cross-linking is carried out by polyaddition and for $M^{Vi}(D)_xM^{Vi}$ and/or $M(D)_x(D)_y^{Vi}M$ and/or $M^{Vi}(D)_x(D)_y^{Vi}M'$+M'DM' or MD'M or MDD'M or M'DD'M oils in the presence of a platinum catalyst, the cold plasma treatment according to the invention produces a cross-linked network and $MeSi(-CH_2-CH_2-)_{1/2}(O_{2/2})$ (starting from $D^{Vi}$+D' or M' or from D'+$D^{Vi}$ or $M^{Vi}$), $MeSi(-CH(CH_3)-)_{1/2}(O_{2/2})$ (starting from $D^{Vi}$+D' or M' or from D'+$D^{Vi}$ or $M^{Vi}$); $Me_2Si(-CH_2-CH_2-)_{1/2}(O_{1/2})$ (starting from M'+$D^{Vi}$ or $M^{Vi}$ or of $M^{Vi}$+D' or M'), $Me_2Si(-CH(CH_3)-)_{1/2}O_{1/2}$ (starting from M'+$D^{Vi}$ or $M^{Vi}$ or of $M^{Vi}$+D' or M') units.

A more particular subject of the present application is therefore a substrate which is at least partially coated with an anti-adhesive coating comprising ⇨ an anti-adhesive silicone composition at least partly (ideally entirely) cross-linked and based on $Me_2SiO_{2/2}$, $MeSi(-CH_2-CH_2-)_{1/2}(O_{2/2})$, $MeSi(-CH(CH_3)-)_{1/2}(O_{2/2})$ $Me_3SiO_{1/2}$, $Me_2Si(-CH_2-CH_2-)_{1/2}(O_{1/2})$, $Me_2Si(-CH(CH_3)-)_{1/2}O_{1/2}$, and $SiO_{4/2}$ units, ⇨ an "anti-adhesive" silicone composition which is at least partly (ideally entirely) cross-linked and based on $Me_2SiO_{2/2}$, $-(CH_2-CH-)_n-COO-R-SiMe(O_{2/2})$, $Me_3SiO_{1/2}$, $-(CH_2-CH-)_n-COO-R-SiMe_2(O_{1/2})$ and $SiO_{4/2}$ units, ⇨ or an "anti-adhesive" silicone composition which is at least partly (ideally entirely) cross-linked and based on $Me_2SiO_{2/2}$, $Me_3SiO_{1/2}$, $SiO_{4/2}$ units,

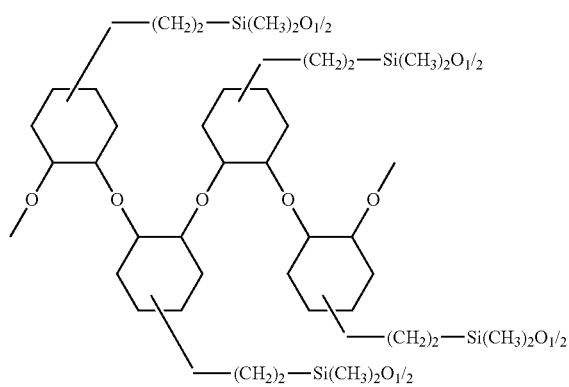

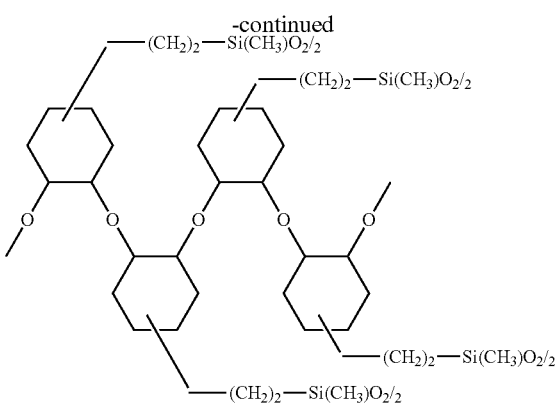

When it is desired to produce a substrate which is at least partially coated with an anti-adhesive silicone substrate with a low release force (so-called "premium release") vis-à-vis an adhesive, for example less than 10 cN/cm, one or more silicone oils is advantageously used, having a significant quantity of D units, for example greater than 80 molar % and a small quantity of functional units, for example less than 5 molar %.

When it is desired to produce a substrate with a medium release force, for example between 10 cN/cm and 30 cN/cm (so-called "medium release") one or more silicone oils is advantageously used, having a significant quantity of D units, for example greater than 80 molar % and a small quantity of functional units, for example less than 5 molar %.

When it is desired to produce a substrate with a high release force (so-called "tight release"), for example greater than 30 cN/cm, one or more silicone oils is advantageously used, having a significant quantity of $SiO_2$ units, for example greater than 5 molar % and a small quantity of D units, for example less than 80 molar %.

By "functional" unit is meant for example within the meaning of the present invention, an M, D or T siloxy unit of which at least one of the R substituents of silicon is an organofunctional group, e.g. of the type of those defined above.

A recognized protocol for measuring the release force is for example that described by FINAT according to FINAT 3 or FINAT 10. The release force of the low peel speed adhesive at an angle of 180° at a speed of 300 mm/min is measured using a calibrated dynamometer.

Release test pieces prepared by maintaining then at 23° C. for 20 hours (FINAT 3) and at 70° C. for 20 hours (FINAT 10) at a pressure of 70 g/cm². They are removed from their pressurization then stored at 23° C. at 50% relative humidity for at least 4 hours before the measurement.

The test pieces have a width of 2.54 cm and a length of at least 175 mm. The results are expressed in cN/cm.

The anti-adhesive silicone compositions which are subjects of the present invention, have very useful properties and advantages. In particular they have release forces with adhesives varying over useful ranges of values.

The release forces with adhesives can be modulated linearly from 10 cN/cm to 300 cN/cm, as a function of the dose of energy received at the surface of the silicone.

A first advantage of the invention is the avoidance or minimization of the use of MQ or MM$^{Vi}$Q or MD$^{Vi}$Q or MM'Q or MD'Q resins, which are difficult to produce, and which have to be introduced as standard in the hope of obtaining a power to modulate the release forces in an anti-adhesive composition.

Compared with plasma treatments under vacuum, the above are simple to implement and can be used in dynamic mode, at a speed of movement of the substrate comprised between 1 and 1000 m/min and preferably between 10 and 250 m/min. This method constitutes another advantage of the invention.

The treatment is virtually permanent, which constitutes another advantage, as the treated silicone film can be stored for several months at ambient temperature and a low degree of hygrometry (<50% relative humidity) without modifying the anti-adhesive power. This process constitutes another advantage of the invention.

The treatment makes it possible to develop products with a good homogeneity.

These properties and qualities are illustrated hereafter in the experimental part. They justify the use of the anti-adhesive silicone compositions described above in order to increase the release forces so as to obtain release so-called "Tight-Release" or "Medium-Release" forces.

This is why a subject of the present application is also a method for increasing the release forces of a substrate coated with an anti-adhesive silicone composition above vis-à-vis an adhesive in order to obtain a so-called "Tight-Release" or "Medium-Release" force.

It is equally possible to convert "Low-release" forces to "Medium-Release" or "Tight-Release" forces, or to convert "Medium-Release" forces to "Tight-Release" forces.

Consequently, a subject of the present application is also a silicone-self-adhesive complex characterized in that it comprises a first substrate coated with an anti-adhesive silicone composition described above and a second substrate coated with an adhesive.

The adhesive is for example an acrylic adhesive, in particular solvent acrylic or water-based acrylic or photo-cross-linkable acrylic, preferably water-based acrylic or solvent acrylic, preferably TESA® 7475, and particularly the water-based acrylic adhesive marketed by BASF under the trade-mark BASF Acronal®, tackified or not—preferably Acronal® v210.

It can also be a rubber adhesive, in particular the commercial adhesives TESA® 7476 or TESA® 4154 or TESA® 4651 mentioned by way of example.

It can also be a "hot-melt" or UV hot-melt adhesive, in particular one of those described in the U.S. Pat. No. 6,720,399 or one of BASF's photopolymerizable adhesives known under the trade-mark AC-Resin®, for example AC-Resin® 258 UV.

The acrylic adhesives, or the rubber adhesives are preferred.

Such complexes can in particular be utilized in numerous applications such as labels, rolls of adhesive tape in particular for packaging, sanitary pads, the adhesive tapes of nappies, in particular disposable nappies, and bituminous coatings.

This is why a subject of the present application is also labels, rolls of adhesive tape in particular for packaging, sanitary pads, nappies, in particular disposable nappies, and bituminous coatings comprising a silicone-self-adhesive complex described above.

A subject of the present application is also so-called "clear on clear" labels, i.e. comprising transparent adhesive supports and silicone.

A quite particular subject of the present application is an envelope provided with a complex described above. For this purpose either the flap or the body of the envelope can carry the adhesive, and the other the anti-adhesive silicone composition.

The preferential conditions of implementation of the methods described above also apply to the other subjects of the invention referred to above, in particular to the anti-adhesive silicone compositions and to the complexes.

The following examples illustrate the present application.

EXPERIMENTAL PART

Preparation 1

Preparation of a Silicone Coating Cross-Linked by Polyaddition

A silicone composition is prepared, based on:

a) an α,ω-(dimethylvinylsiloxy)polydimethylsiloxane oil: $(Me_2ViSiO_{1/2})$ containing poly(dimethylsiloxy) type units: $(Me_2SiO_{2/2})$ and poly(methylvinylsiloxy): $(MeViSiO_{2/2})$, with 2.5% by weight of Vi and having a viscosity of 450 cps, b) a polydimethylsiloxane oil with α,ω-(dimethylvinylsiloxy) ends: $(Me_2ViSiO_{1/2})$ containing poly(dimethylsiloxy) type units: $(Me_2SiO_{2/2})$, with 0.37% by weight of Vi and having a viscosity of 600 cps, c) a hydrogenated α,ω-(trimethylsiloxy)polydimethylsiloxane oil: $(Me_3SiO_{1/2})$ containing poly(methylhydrogenosiloxy) type units: $(MeHSiO_{2/2})$, with 1.5% by weight of H and having a viscosity of 30 cps, as follows:

1000 g of the a)/b) mixture 80/20 is mixed with 70 g of the polymer c) by stirring then 50 g of Karstedt platinum-based catalyst is added to 2800 ppm of Pt diluted in a polydimethylsiloxane oil d) with α,ω-(dimethylvinylsiloxy) ends: $(Me_2ViSiO_{1/2})$ containing poly(dimethylsiloxy) type units: $(Me_2SiO_{2/2})$, with 0.5% by weight of Vi and having a viscosity of 350 cps.

The preparation is again mixed before being poured into the coating slot for coating on film.

Using a pilot-scale coating machine equipped with five-cylinder head 0.8 g/m² of the silicone composition thus obtained is deposited on a polyester support from Toray (ref Lumirror® 60.01).

Using heat, the silicone composition is cross-linked in ovens at a throughput speed of 100 m/min.

The temperature of the support is 140° C. on leaving the oven.

Example 1

A plasma treatment of the cross-linked siliconized polyester film of preparation 1 is carried out at 75 m/min according to the ALDYNE® process for an electrical dose at the surface of the silicone of 20 W/minute/cm². The operation is carried out at ambient temperature and pressure.

The ALDYNE® process consists of using filamentary electrical discharges, uniformly distributed at atmospheric pressure in gaseous mixtures of controlled composition and excluding all traces of oxygen from the air, carrying out dry coating in autonomous fashion or in line by replacing for example Corona and/or primary coating stations.

The atmosphere is reductive as the treatment gas used is pure nitrogen doped with 500 ppm of hydrogen.

In-line coating is carried out with a natural rubber adhesive TESA®4651 and an acrylic adhesive TESA®7475.

Example 2

A plasma treatment is carried out according to the ALDYNE® process, on the siliconized polyester film of preparation 1 at 75 m/min for an electrical dose at the surface of the silicone of 20 W/minute/cm².

The atmosphere is oxidizing as the treatment gas used is pure nitrogen doped with 500 ppm of nitrogen protoxide.

In-line coating is carried out with a natural rubber adhesive TESA®4651 and an acrylic adhesive TESA®7475.

Example 3

A plasma treatment is carried out according to the ALDYNE® process, on the siliconized polyester film of preparation 1 at 75 m/min for an electrical dose at the surface of the silicone of 20 W/minute/cm².

The atmosphere is organic as the treatment gas used is pure nitrogen doped with 500 ppm of acetylene.

In-line coating is carried out with a natural rubber adhesive TESA®4651 and an acrylic adhesive TESA®7475.

Example 4

A plasma treatment is carried out according to the ALDYNE® process, on the siliconized polyester film of preparation 1 at 75 in/min for an electrical dose at the surface of the silicone of 20 W/minute/cm².

The atmosphere is neutral as the treatment gas used is pure undoped nitrogen.

In-line coating is carried out with a natural rubber adhesive TESA®4651 and an acrylic adhesive TESA®7475.

Example 5

A plasma treatment is carried out according to the ALDYNE® process, on the siliconized polyester film of preparation 1 at 75 m/min for an electrical dose at the surface of the silicone of 60 W/minute/cm².

The atmosphere is neutral as the treatment gas used is pure nitrogen doped with 500 ppm of hydrogen.

In-line coating is carried out with a natural rubber adhesive TESA®4651 and an acrylic adhesive TESA®7475.

Example 6

A plasma treatment is carried out according to the ALDYNE® process, on the siliconized polyester film of preparation 1 at 75 m/min for an electrical dose at the surface of the silicone of 60 W/minute/cm².

The atmosphere is neutral as the treatment gas used is pure undoped nitrogen.

After 24 hours coating is carried out with a natural rubber adhesive TESA®4651 and an acrylic adhesive TESA®7475.

Study of the Properties:

After leaving the coating machine, the film is subjected to an ageing test which consists of storing the adhesive complexes under pressure at 70 g/cm2 for 20 hours at 20° C. and 20 hours at 70° C. in accelerated ageing.

The release force for each of the products is then measured according to the FINAT test method numbered FINAT 3 (20 hours at 23° C.) and FINAT 10 (20 hours at 70° C.).

The results obtained are the following:

| 20 hours at 23° C. | Conditions | Dose (W/min/cm²) | TESA® 4651 cN/cm | TESA® 7475 cN/cm |
|---|---|---|---|---|
| Control | Without plasma | 0 | 7 | 7 |
| Example 1 | $N_2$ plasma/doped with $H_2$ | 20 | 23.5 | 256 |

-continued

| 20 hours at 23° C. | Conditions | Dose (W/min/cm²) | TESA® 4651 cN/cm | TESA® 7475 cN/cm |
|---|---|---|---|---|
| Example 2 | $N_2$ plasma/doped with $N_2O$ | 20 | 19 | 238 |
| Example 3 | $N_2$ plasma/doped with HC≡CH | 20 | 61.7 | 321 |
| Example 4 | Undoped $N_2$ plasma | 20 | 40 | 280 |
| Example 5 | $N_2$ plasma/doped with $H_2$ | 60 | 53 | 1000 |
| Example 6 | Undoped $N_2$ plasma | 60 | 43 | 1000 |

| 20 hours at 70° C. | Conditions | Dose (W/min/cm²) | TESA® 4651 cN/cm | TESA® 7475 cN/cm |
|---|---|---|---|---|
| Control | Without plasma | 0 | 12 | 14 |
| Example 1 | $N_2$ plasma/doped with $H_2$ | 20 | 70 | 250 |
| Example 2 | $N_2$ plasma/doped with $N_2O$ | 20 | 37 | 233 |
| Example 3 | $N_2$ plasma/doped with HC≡CH | 20 | 150 | 321 |
| Example 4 | Undoped $N_2$ plasma | 20 | 70 | 280 |
| Example 5 | $N_2$ plasma/doped with $H_2$ | 60 | 65 | 1000 |
| Example 6 | Undoped $N_2$ plasma | 60 | 43 | 1000 |

It is noted that the dose of 60 W/minute/cm² is too high for the acrylic adhesive TESA® 7475 (Examples 5 and 6). The doped or undoped $N_2$ plasma treatments, such that the dose is less than 60 W/minute/cm², are very effective for modulating the release forces.

The invention claimed is:

1. Method for preparing a silicone-self-adhesive complex, the method comprising the steps of:
    treating a first substrate having a surface that is at least partially coated with an anti-adhesive coating composition based upon at least one at least partially cross-linked silicone oil with cold plasma at about atmospheric pressure in an atmosphere optionally doped with less than 5% by weight of at least one dopant wherein (a) the atmosphere is free from $O_2$ and is selected from the group consisting of a nitrogen atmosphere and a carbon dioxide atmosphere, and wherein (b) when the atmosphere is the nitrogen atmosphere, the at least one dopant is selected from the group consisting of $H_2$; $N_2O$; Acetylene; $SiH_4$; $CF_4$, $CO_2$, $H_2O$, and when the atmosphere is the carbon dioxide atmosphere, the at least one dopant is selected from the group consisting of $H_2$; $N_2O$; Acetylene; $SiH_4$; $CF_4$, $N_2$, $H_2O$; and
    reversibly adhering the at least partially coated treated surface of the first substrate to an adhesive coating on a surface of a second substrate to obtain a silicone-self-adhesive complex,
    whereby after the treating step the at least partially coated treated surface of the first substrate is anti-adhesive and has adhesion properties different than before the treating step.

2. Method according to claim 1, wherein the at least one partially cross-linked silicone oil comprises at least one polyorganosiloxane oil having M and D units wherein M is $R_3SiO_{1/2}^-$ and D is $R_2SiO_{2/2}^-$, each R radical is selected independently from the group consisting of H; —OH, and an optionally substituted, linear or branched, organic hydrocarbon radical functional unit containing 0 or 1 degree of unsaturation.

3. Method according to claim 2, wherein the M units are selected from the group consisting of $Me_3SiO_{1/2}$, $Me_2ViSiO_{1/2}$, $Me_2EpoxySiO_{1/2}$, $Me_2AcrylateSiO_{1/2}$, $ViMe_2SiO$ and $Me_2HSiO_{1/2}$.

4. Method according to claim 2 wherein the D units are selected from the group consisting of $Me_2SiO_{2/2}$, $MeViSiO_{2/2}$, $MeHSiO_{2/2}$, $MeEpoxySiO_{2/2}$ and $MeAcrylateSiO_{2/2}$.

5. Method according to claim 2, wherein the M units and D units are cross-linked in the anti-adhesive coating composition by at least one route selected from the group consisting of poly-addition, cationic and radicular, optionally under at least one of actinic, thermal, and electron beam activation.

6. Method according to claim 2, wherein the organic hydrocarbon radical functional unit is selected from the group consisting of an alkyl group, an alkenyl group, an aryl group, an organofunctional group, an aminoalkyl group, an epoxyalkyl group, a (meth)acryloxyalkyl group, an isocyanoalkyl group, a trifluoroalkyl group, and a perfluoroalkyl group.

7. Method according to claim 1, wherein the first substrate is based on plastic materials or paper.

8. Method according to claim 1, wherein the method is implemented at a pressure of 0.75 to 1.5 bars.

9. Method according to claim 1, wherein the atmosphere is based on nitrogen doped with $H_2$, $C_2H_2$ or $N_2O$.

10. Method according to claim 1, wherein the anti-adhesive coating composition receives a dose of energy between 10 $W/minute/cm^2$ and 80 $W/minute/cm^2$.

11. Method according to claim 1, wherein the first substrate is treated continuously at a linear speed of movement between 1 m/min and 1000 m/min.

12. Method according to claim 1, wherein the at least one at least partially cross-linked silicone oil comprises one of:
  a) more than 80 molar % of D units and less than 5 molar % of a functional unit,
  b) more than 80 molar % of D units and more than 5 molar % of a functional unit, and
  c) less than 80 molar % of D units and more than 5 molar % of $S_iO_2$.

13. Method according to claim 1, wherein the adhesion properties are virtually permanently different after the treating step than before the treating step.

14. Method according to claim 1, wherein the anti-adhesive coating composition is free of MQ or $MM^{vi}Q$ or $MD^{vi}Q$ or MM'Q or MD'Q resins.

* * * * *